US008888467B2

(12) United States Patent
Nakamura (10) Patent No.: US 8,888,467 B2
(45) Date of Patent: Nov. 18, 2014

(54) FLUID PUMP

(75) Inventor: Motoo Nakamura, Okazaki (JP)

(73) Assignee: Aisin Seiki Kabushiki Kaisha, Kariya-Shi, Aichi-Ken (JP)

(*) Notice: Subject to any disclaimer, the term of this patent is extended or adjusted under 35 U.S.C. 154(b) by 318 days.

(21) Appl. No.: 13/114,552

(22) Filed: May 24, 2011

(65) Prior Publication Data

US 2012/0082572 A1  Apr. 5, 2012

(30) Foreign Application Priority Data

Sep. 30, 2010 (JP) ................................ 2010-221650
Oct. 27, 2010 (JP) ................................ 2010-240587

(51) Int. Cl.
| | | |
|---|---|---|
| *F16H 13/10* | (2006.01) | |
| *F04B 49/02* | (2006.01) | |
| *F04D 15/00* | (2006.01) | |
| *F01P 5/12* | (2006.01) | |
| *F04D 13/02* | (2006.01) | |
| *F16H 13/02* | (2006.01) | |
| *F16D 13/10* | (2006.01) | |
| *F04D 15/02* | (2006.01) | |
| *F16D 13/14* | (2006.01) | |
| *F16D 25/08* | (2006.01) | |

(52) U.S. Cl.
CPC .......... *F04D 13/021* (2013.01); *F04D 15/0066* (2013.01); *F01P 5/12* (2013.01); *F16D 13/14* (2013.01); *F16H 13/02* (2013.01); *F16D 25/08* (2013.01); *F16D 13/10* (2013.01); *F04D 15/02* (2013.01)
USPC .................. 417/319; 476/61; 476/65; 476/67

(58) Field of Classification Search
CPC ... F04D 28/06; F04D 29/02; F04D 2270/051; F04D 2270/075; F04D 2270/19; F04B 49/02; F04B 49/29065; F04B 2203/0201; F04B 2203/021
USPC ..................... 417/319; 476/61, 64–67, 70, 16
See application file for complete search history.

(56) References Cited

U.S. PATENT DOCUMENTS 2,092,104 A * 9/1937 Bowden ...................... 192/66.22
6,561,770 B2 * 5/2003 Okuda .......................... 417/223
(Continued)

FOREIGN PATENT DOCUMENTS

| EP | 1464870 A1 | 10/2004 |
|---|---|---|
| JP | 2008-169763 A | 7/2008 |
| JP | 2009-293578 A | 12/2009 |

OTHER PUBLICATIONS

European Search Report issued Feb. 19, 2014 by the European Patent Office in corresponding European Patent Application No. 11167980.9.

*Primary Examiner* — Charles Freay
(74) *Attorney, Agent, or Firm* — Buchanan Ingersoll & Rooney PC (57) ABSTRACT

A fluid pump includes a drive shaft driven by power from an engine, a rotor adapted to be provided at a housing and rotating unitarily with the drive shaft, a driving wheel which is provided separately from the drive shaft and to which the power from the engine is always transmitted when the engine is running, a driven wheel transmitting the power from the engine to the drive shaft upon being in contact with the driving wheel, and a displacement mechanism causing the driving wheel and the driven wheel to be out of contact from each other by moving at least one of the driving wheel and the driven wheel.

21 Claims, 7 Drawing Sheets

(56) References Cited

U.S. PATENT DOCUMENTS 8,079,828 B2 * 12/2011 Togawa et al. ............... 417/319
8,172,550 B2 * 5/2012 Ji .............................. 417/199.2
2006/0165539 A1 * 7/2006 Boffelli et al. ............... 417/319
2007/0137593 A1 6/2007 Di Giacomo et al.
2010/0206682 A1 8/2010 George et al.

* cited by examiner

FLUID PUMP

CROSS REFERENCE TO RELATED APPLICATIONS

This application is based on and claims priority under 35 U.S.C. §119 to Japanese Patent Application 2010-240587, filed on Oct. 27, 2010 and Japanese Patent Application 2010-221650, filed on Sep. 30, 2010, the entire contents of which are incorporated herein by reference.

TECHNICAL FIELD

This disclosure relates to a fluid pump.

BACKGROUND DISCUSSION

According to a known fluid pump disclosed in JP2008-169763A, driving power of an engine is transmitted by means of an accessory driving belt wound around a driving pulley. Thus, as the driving pulley rotates, a rotary shaft rotates. When the rotary shaft rotates, an impeller rotates unitarily with the rotary shaft, thereby circulating a cooling water through an engine cooling system.

According to a variable displacement fluid pump disclosed in JP2009-293578A, effective heights of vanes are changed by means of a movement of a movable member. According to the variable displacement fluid pump, the effective heights of the vanes are changed on the basis of a change in a volume of a thermo wax which is caused by a heat transmission, thereby varying a discharge amount of the variable displacement fluid pump.

However, the fluid pump disclosed in JP2008-169763A always circulates the cooling water when the engine is running. This may restrict a reduction in a warm-up time of the engine because the cooling water is circulated even during a start-up of the engine.

The variable displacement fluid pump disclosed in JP2009-293578A always operates even when the effective heights of the vanes are at the minimum height, thereby generating a driving torque. This may result in a wasted consumption of power.

A need thus exists for a fluid pump which is not susceptible to the drawback mentioned above.

SUMMARY

According to an aspect of this disclosure, a fluid pump includes a drive shaft driven by power from an engine, a rotor adapted to be provided at a housing and rotating unitarily with the drive shaft, a driving wheel which is provided separately from the drive shaft and to which the power from the engine is always transmitted when the engine is running, a driven wheel transmitting the power from the engine to the drive shaft upon being in contact with the driving wheel, and a displacement mechanism causing the driving wheel and the driven wheel to be out of contact from each other by moving at least one of the driving wheel and the driven wheel.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of this disclosure will be explained with reference to the attached drawings.

Figure 1:
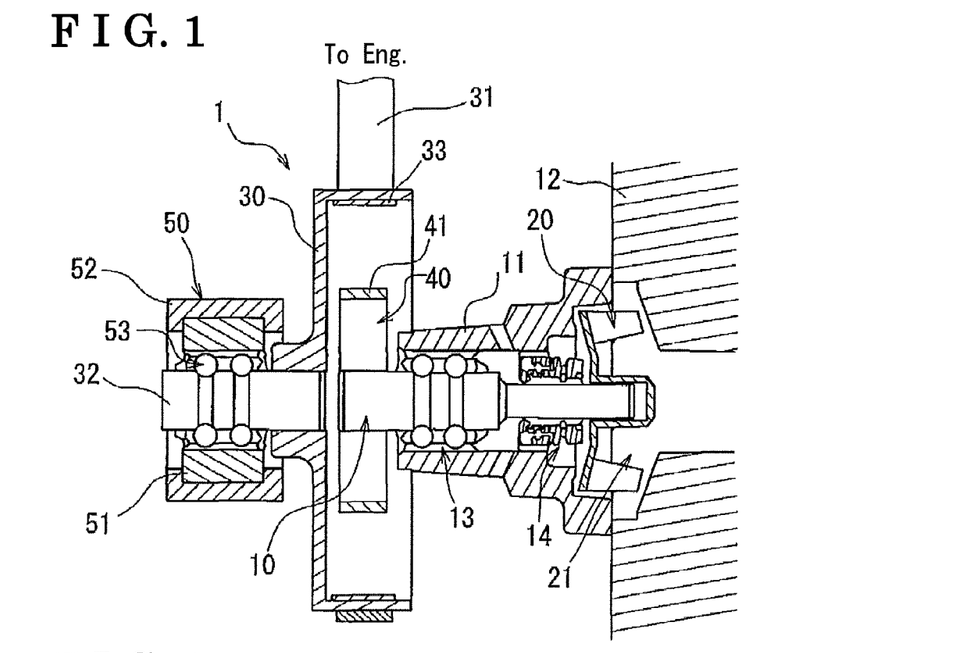
FIG. 1 is a cross-sectional view of a water pump related to a first embodiment disclosed here.

As shown in FIG. 1, a water pump 1 (a fluid pump) related to a first embodiment of this disclosure includes a pump body 11 (a housing) which is made by casting or other methods and is adapted to be fixedly mounted on an engine block 12 (the housing) by means of a bolt. A bearing shaft 10 (a drive shaft) is supported at the pump body 11 via a bearing 13 in a manner that the bearing shaft 10 rotates about a rotation axis thereof relative to the pump body 11.

An impeller 20 (a rotor) is housed in a pump housing 21 formed between the pump body 11 and the engine block 12, and is fixedly coupled to one end of the bearing shaft 10 by means of press-fitting or other methods. A mechanical seal 14 having an annular shape is provided on an outer circumferential surface of the bearing shaft 10 so as to be positioned between the impeller 20 and the bearing 13 in an axial direction of the bearing shaft 10 in order to restrict coolant water from intruding into the pump body 11. A driven pulley 40 (a driven wheel) is fixedly coupled to the other end of the bearing shaft 10. A friction material 41 is applied to an outer circumferential surface of the driven pulley 40.

A driving pulley 30 (a driving wheel) is positioned so that an inner circumferential surface of the driving pulley 30 is contactable with an outer circumferential surface of the driven pulley 40. That is, the driven pulley 40 is provided at an inside of a hollow portion of the driving pulley 30. Power from an engine is transmitted to the driving pulley 30 via a belt 31 (a power transmitting member) wound around an outer circumferential surface of the driving pulley 30. The driving pulley 30 is fixedly coupled to one end of a driving pulley bearing shaft 32 so as to rotate with the driving pulley bearing shaft 32. A friction material 33 is applied to the inner circumferential surface of the driving pulley 30 so that a friction force is generated between the friction material 33 and the friction material 41 that is applied to the outer circumferential surface of the driven pulley 40 when the driving pulley 30 and the driven pulley 40 are in contact with each other. The power from the engine, that is, the power generated by the engine is transmitted from the driving pulley 30 to the driven pulley 40 by means of the friction force. An actuator 50 (a displacement mechanism) is coupled to the other end of the drive pulley bearing shaft 32.

Figure 2:
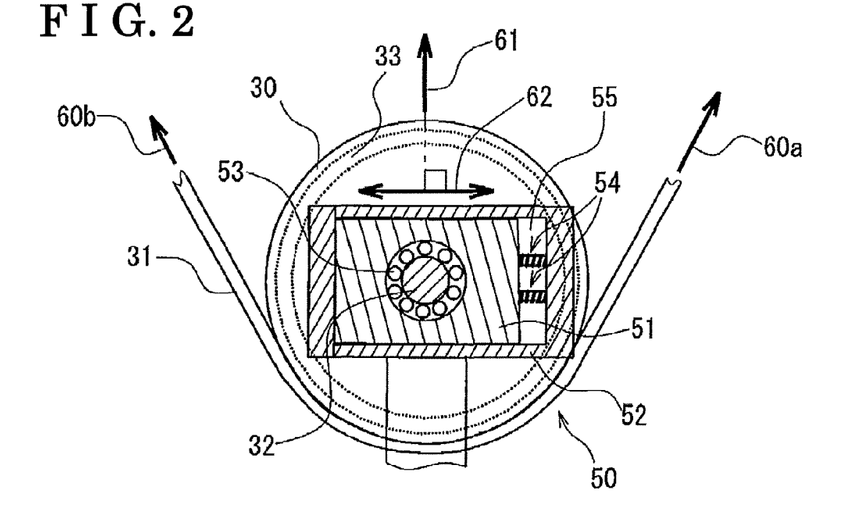
FIG. 2 is a cross-sectional view of an actuator related to the first embodiment disclosed here.

As shown in FIG. 2, the actuator 50 includes a slide 51 supporting the driving pulley bearing shaft 32 via a drive pulley bearing 53 in a manner that the drive pulley bearing shaft 32 rotates about a rotation axis thereof relative to the slide 51. A slide guide 52 is provided at the slide 51 so as to cover the slide 51 having a piston-like structure. The slide guide 52 is configured in a manner that the slide 51 is movable relative to the slide guide 52 in a perpendicular direction 62 that is perpendicular relative to a direction of a resultant force 61 of a tensile force 60a (a force) and a tensile force 60b (the force) both of which act on the belt 31 that is wound around the outer circumferential surface of the driving pulley 30. A spring 54 (a resilient member) for causing the driving pulley 30 to come in contact with the driven pulley 40 by means of a resilient force is provided between the slide 51 and the slide guide 52 in the perpendicular direction 62. A closed chamber 55 is provided between the slide 51 and the slide guide 52, where the spring 54 is provided. The closed chamber 55 is provided in a manner that a pressure therein is controllable. When a negative pressure (a gas pressure) is applied to the closed chamber 55 and then the pressure inside the closed chamber 55 decreases, the slide 51 moves in the perpendicular direction 62 until reaching a position in which the negative pressure of the closed chamber 55 is balanced out by the resilient force of the spring 54, that is, the slide 51 moves in the perpendicular direction 62 until a movement of the slide 51 caused by the negative pressure is balanced out by the movement of the slide 51 caused by the spring 54. As the slide 51 moves, the driven pulley bearing shaft 32 supported by the slide 51 also moves in the perpendicular direction 62, and thus a state where the driving pulley 30 and the driven pulley 40 are out of contact from each other is established.

Next, an operation of the water pump 1 of this disclosure will be explained.

Figure 3:
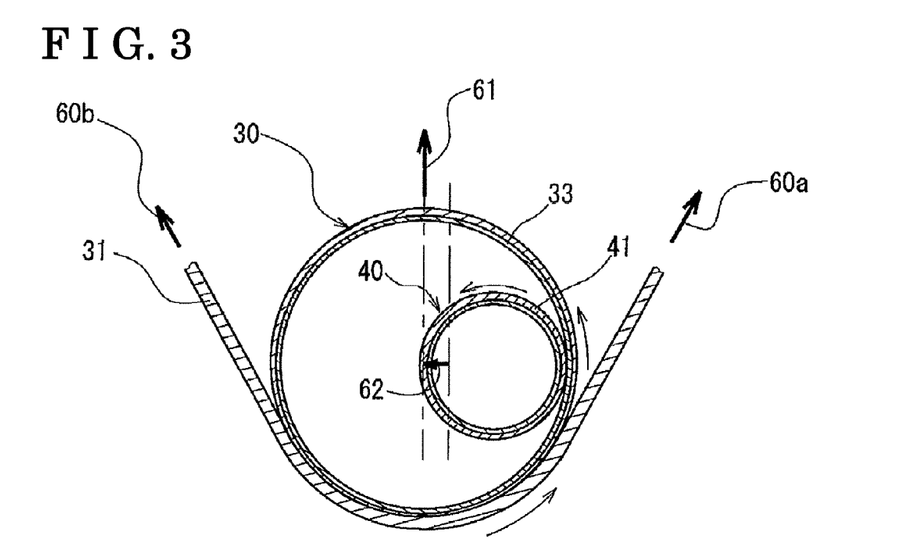
FIG. 3 is a diagram explaining a state in which a driving pulley and a driven pulley related to the embodiments disclosed here are in contact with each other.

In FIG. 3, the driving pulley 30 and the driven pulley 40 are in contact with each other, that is, the driving pulley 30 and the driven pulley 40 are connected with each other so that a power transmission is achieved therebetween. The belt 31 wound around a crank pulley and on the driving pulley 30 rotates the driving pulley 30, and thus the power from the engine is transmitted to the driving pulley 30. The driving pulley 30 is caused to come in contact with the driven pulley 40 by the resilient force of the spring 54 provided in the actuator 50. When the driving pulley 30 is in contact with the driven pulley 40, the friction force is generated between the friction material 33 of the driving pulley 30 and the friction material 41 of the driven pulley 40, and thus the power from the engine is transmitted from the driving pulley 30 to the driven pulley 40. That is, the driving pulley 30 and the driven pulley 40 are configured to be unitarily rotatable with each other. As the driven pulley 40 rotates, a rotation of the driven pulley 40 is transmitted to the impeller 20 via the bearing shaft 10 and consequently, the power from the engine is transmitted to the impeller 20. As the impeller 20 rotates, the coolant water contained in the pump housing 21 is discharged via an outlet of the pump 1 and circulated through the engine.

Figure 4:
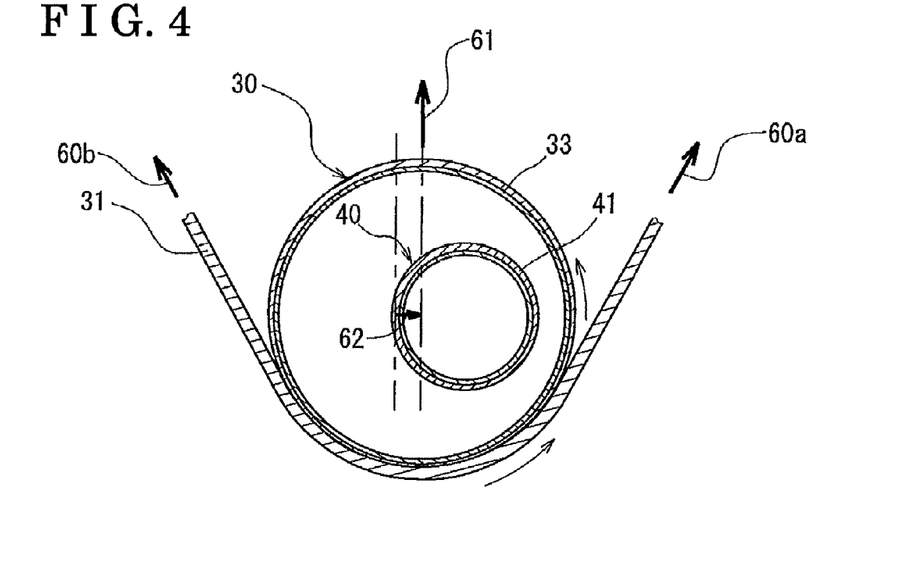
FIG. 4 is a diagram explaining a state in which the driving pulley and the driven pulley are out of contact from each other.

In FIG. 4, the driving pulley 30 and the driven pulley 40 are out of contact from each other, that is, the driving pulley 30 and the driven pulley 40 are disconnected from each other so that no power transmission is achieved therebetween. When the negative pressure is applied to the closed chamber 55 of the actuator 50, a force attracting the slide 51 (an attracting force) moves the slide 51 in the perpendicular direction 62 against the resilient force of the spring 54, and thus the driving pulley 30 comes out of contact from the driven pulley 40. When the outer circumferential surface of the driven pulley 40 is out of contact from the inner circumferential surface of the drive pulley 30, no friction force is generated between the friction material 33 of the driving pulley 30 and the friction material 41 of the driven pulley 40, and thus no power is transmitted from the driving pulley 30 to the driven pulley 40. Accordingly, an operation of the impeller 20 in the pump housing 21 remains stopped, which stops the coolant water from circulating through the engine.

According to the water pump 1 related to the first embodiment, the actuator 50 causes the impeller 20 to stop rotating when the engine starts up by moving the drive pulley 30 so that the drive pulley 30 comes out of contact from the driven pulley 40. Thus, an overcooling of the engine is restricted and a warm-up time of the engine is reduced.

No power is transmitted from the engine to the impeller 20 when the impeller 20 stops rotating, thereby restricting a wasted consumption of the power.

Because the actuator 50 moves the drive pulley 30 in the perpendicular direction 62 relative to the direction of the resultant force 61 of the tensile force 60a and the tensile force 60b, the resultant force 61 of pressing forces that are caused by the belt 31 and are applied to the actuator 50 is less likely to interfere with the movement of the slide 51. Thus, a force of the actuator 50 for moving the driving pulley 30 is restricted from acting against the resultant force 61 of the pressing forces that are caused by the belt 31 and are applied to the actuator 50. Accordingly, the actuator 50 needs to supply only sufficient force to move the driving pulley 30, and as a result, the actuator 50 having a small size is provided.

The actuator 50 causes the driving pulley 30 to come in contact with the driven pulley 40 by means of the resilient force of the spring 54 when no negative pressure is applied to the closed chamber 55, and thus the impeller 20 rotates. Therefore, even in case that the pressure of the closed chamber 55 is out of control for any cause, the driving pulley 30 and the driven pulley 40 remain in contact with each other according to a normally-closed principle, that is, a path of power transmission is closed, and thus the impeller 20 rotates, which provides a fail-safe structure. The fail-safe structure refers to a structure in which the driving pulley 30 and the driven pulley 40 remain in contact with each other even when a switching between the states where the driving pulley 30 and the driven pulley 40 are in contact with and out of contact from each other is disabled, and thus the impeller 20 rotates in case of a failure of the actuator 50. Accordingly, the coolant water is supplied to the engine so as to restrict the engine from being overcooled even in case of the failure of the actuator 50.

The actuator 50 is structured in a manner that the slide 51 is pushed by the resilient force of the spring 54 and is attracted by the negative pressure inside the closed chamber 55, thereby moving the driving pulley 30. Thus, the actuator 50 is controlled by utilizing the negative pressure generated by, for example, a suction stroke of a piston of the engine, and thus there is no need to additionally provide a complicated mechanism including, for example, electrical equipment, a hydraulic mechanism or the like, to the water pump 1.

Figure 5A:
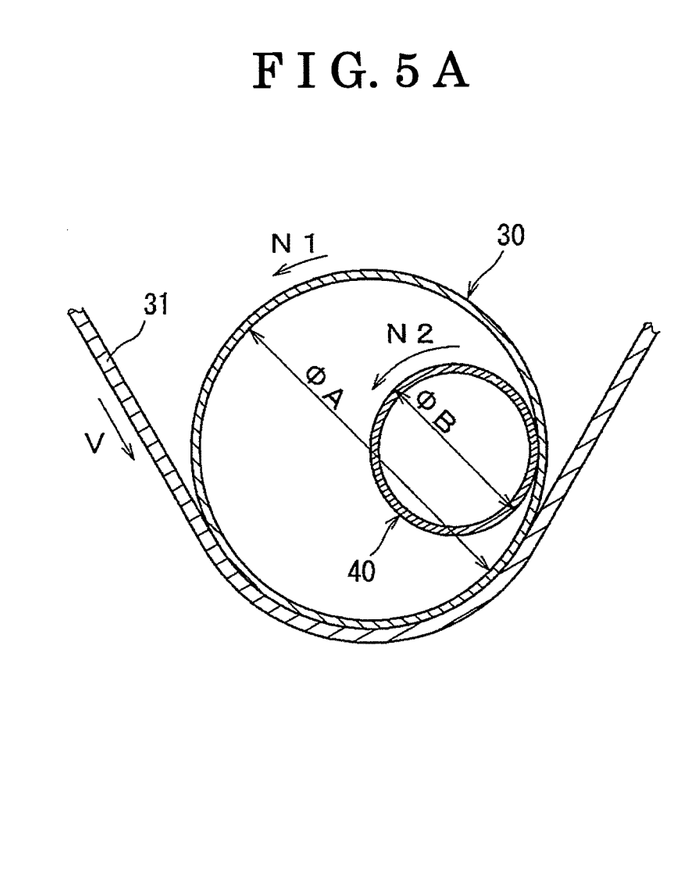
FIG. 5A is a diagram explaining an example in which a pulley ratio between the driving pulley and the driven pulley whose outer circumferential surface is in contact with an inner circumferential surface of the driving pulley is changed, where a diameter of the driven pulley is φB.
Figure 5B:
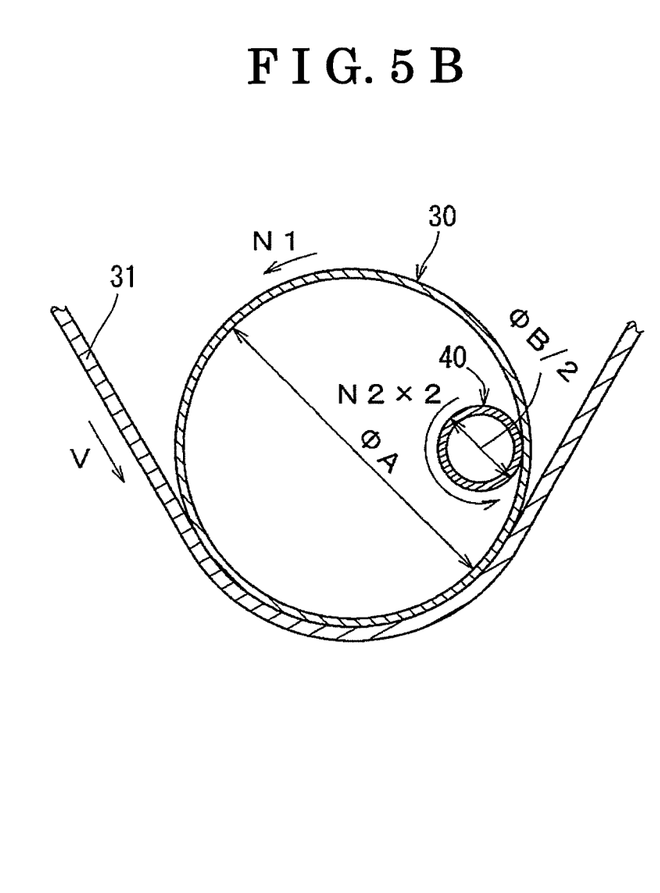
FIG. 5B is a diagram explaining an example in which the pulley ratio between the driving pulley and the driven pulley whose outer circumferential surface is in contact with the inner circumferential surface of the driving pulley is changed, where the diameter of the driven pulley is φB/2.

As shown in FIGS. 5A and 5B, when φA refers to an inner diameter of the driving pulley 30 and φB refers to an outer diameter of the driven pulley 40, a pulley ratio of the driving pulley 30 and the driven pulley 40 is φA/φB. Here, the inner circumferential surface of the driving pulley 30 and the outer circumferential surface of the driven pulley 40 come out of contact from each other.

In FIG. 5A, when a rotation number N1 refers to the number of rotations of the driving pulley 30 and a rotation number N2 refers to the number of rotations of the driven pulley 40, the rotation number N1 is uniquely determined on the basis of a speed V of the belt 31 wound around the outer circumference of the driving pulley 30. Between the rotation number N2 and the pulley ratio, a relationship of N2=(the pulley ratio)×N1 is established. On the contrary, in FIG. 5B, the outer diameter of the driven pulley 40 is φB/2 and the pulley ratio is (φA/φB)×2, and thus the rotation number N2 of the driven pulley 40 is (N2×2), that is, the rotation number N2 is doubled compared to when the outer diameter of the driven pulley 40 is φB. When the rotation number N2 of the driven pulley 40 is doubled, the number of rotations of the impeller 20 is also doubled because the water pump 1 is configured in a manner that the impeller 20, which is fixedly mounted on the one end of the bearing shaft 10, rotates with the driven shaft via the bearing shaft 10.

In FIGS. 5A and 5B, a case in which the number of rotations of the impeller 20 is increased is explained. However, the number of rotations of the impeller 20 may be decreased by changing the pulley ratio of the driving pulley 30 and the driven pulley 40 in a similar manner to that explained above.

According to the water pump 1 of this embodiment, the number of rotations of the impeller 20 is increased and decreased by changing the outer diameter φB of the driven pulley 40, that is, a diameter of the driven pulley 40. Consequently, the water pump 1 meets a wide range of requirements on a discharge volume without changing the impeller 20. The number of rotations of the impeller 20 is also increased and decreased by changing the inner diameter φA of the driving pulley 30. However, by changing the outer diameter φB of the driven pulley 40 instead of changing the inner diameter φA of the driving pulley 30, the number of rotations of the impeller 20 is increased and decreased without changing a length of the belt 31. This method is applicable to the water pump 1 having different numbers of rotations.

Figure 6A:
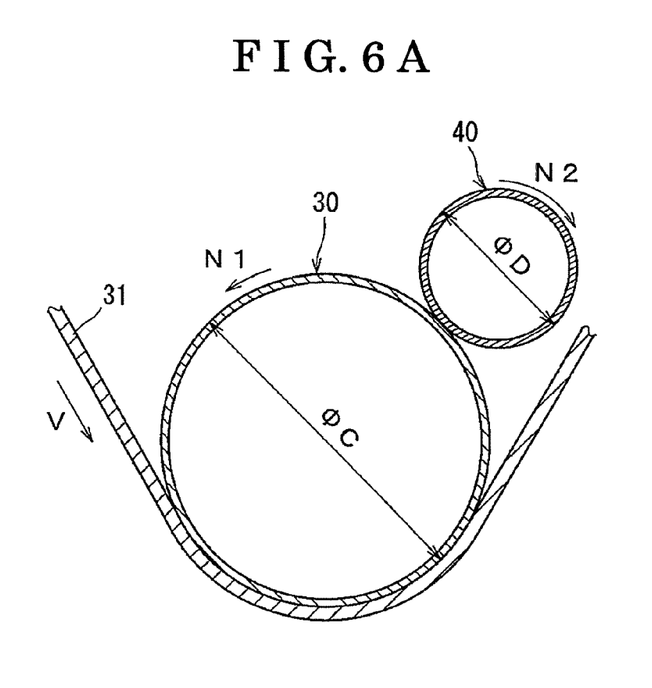
FIG. 6A is a diagram explaining an example in which the pulley ratio between the driving pulley and the driven pulley whose outer circumferential surface is in contact with an outer circumferential surface of the driving pulley is changed, where the diameter of the driven pulley is φD.
Figure 6B:
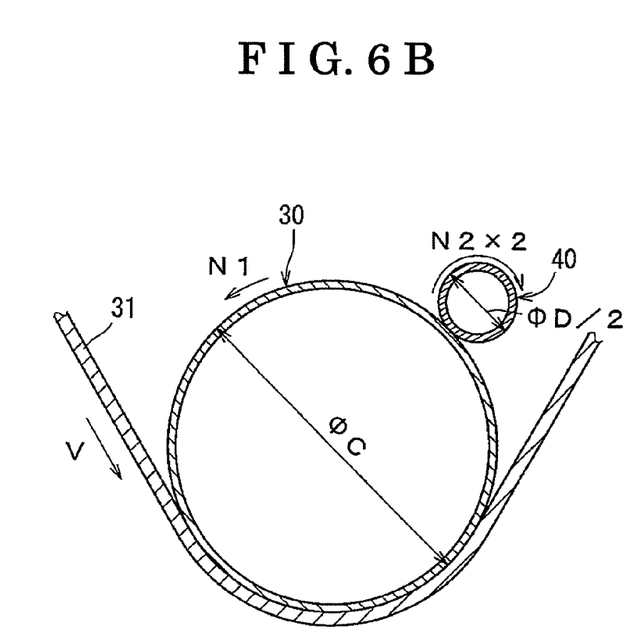
FIG. 6B is a diagram explaining an example in which the pulley ratio between the driving pulley and the driven pulley whose outer circumferential surface is in contact with the outer circumferential surface of the driving pulley is changed, where the diameter of the driven pulley is φD/2.

As shown in FIGS. 6A and 6B, when φC refers to the outer diameter of the driving pulley 30 and φD refers to the outer diameter of the driven pulley 40, the pulley ratio of the driving pulley 30 and the driven pulley 40 is φC/φD. A difference from the structure shown in FIGS. 5A and 5B is that the outer circumferential surface of the driven pulley 40 is in contact with the outer circumferential surface of the driving pulley 30. Other structures shown in FIGS. 6A and 6B are identical to those shown in FIGS. 5A and 5B.

In FIG. 6A, the rotation number N1 of the driving pulley 30 is uniquely determined on the basis of the speed V of the belt 31 wound around the outer circumference of the driving pulley 30 in a similar manner to that of FIG. 5A. The rotation number N2 of the driven pulley 40 is determined on the basis of the pulley ratio (φC/φD). Between the rotation number N2 and the pulley ratio, a relationship of N2=(the pulley ratio)×N1 is established. On the contrary, in FIG. 6B, the outer diameter of the driven pulley 40 is φD/2 and the pulley ratio is (φC/φD)×2, and thus the rotation number N2 is doubled compared to when the outer diameter of the driven pulley 40 is φD.

According to the water pump 1 shown in FIGS. 6A and 6B, the number of rotations of the impeller 20 may be increased and decreased by changing the outer diameter φD of the driven pulley 40. When the rotation number N2 of the driven pulley 40 is doubled, the number of rotations of the impeller 20 is also doubled because the water pump 1 is configured in a manner that the impeller 20, which is fixedly mounted on the one end of the bearing shaft 10, rotates with the driven shaft via the bearing shaft 10.

According to the water pump 1 having the structure shown in FIGS. 6A and 6B, the number of rotations of the impeller 20 is increased and decreased by changing the outer diameter φB of the driven pulley 40, that is, by changing the pulley ratio. Consequently, the water pump 1 meets a wide range of requirements on the discharge volume without changing the impeller 20. The number of rotations of the impeller 20 is also increased and decreased by changing the outer diameter φC of the driving pulley 30, that is, by changing a diameter of the driving pulley 30. This is effective in case there is a space constraint at the inside of the driving pulley 30.

Figure 7:
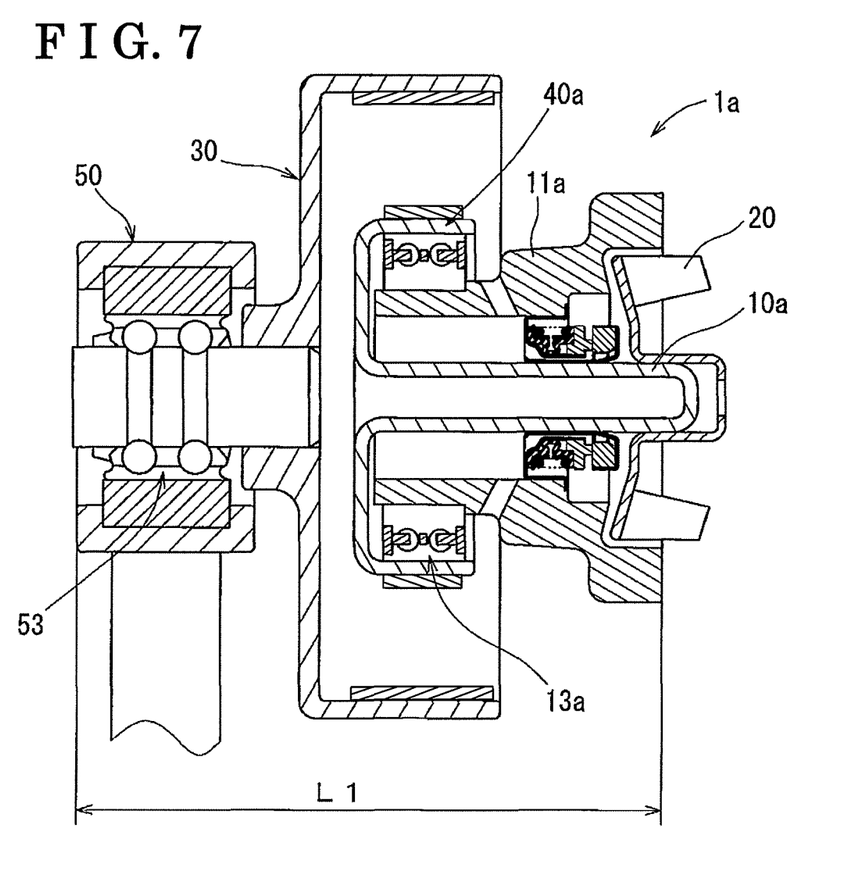
FIG. 7 is a cross-sectional view of a water pump related to a second embodiment disclosed here.

As shown in FIG. 7, a water pump 1a (the fluid pump) related to a second embodiment of this disclosure includes a driven pulley 40a (the driven wheel) and a bearing shaft 10a (the drive shaft) each having a different shape from those of the water pump 1 shown in FIG. 1. The water pump 1a also includes an overall length L1 that is less than that of the water pump 1. Other structures are identical to those of the water pump 1. In the second embodiment, the identical numerical designations are given to the functions and the structures that are identical to those of the first embodiment. Differences in the structure between the water pump 1 and the water pump 1a will be explained hereunder.

The driven pulley 40a and the bearing shaft 10a both included in the water pump 1a are manufactured integrally with each other by press working. A pump body 11a (the housing) is provided in a manner that a part of the pump body 11a is positioned at an inside of the driven pulley 40a. A bearing 13a is provided between the pump body 11a and the driven pulley 40a in a radial direction of the driven pulley 40a. The bearing 13a supports the driven pulley 40a that is formed integrally with the bearing shaft 10a. Other structures and an operation of the water pump 1a are identical to those of the water pump 1.

The water pump 1a, which provides identical effects obtained from the water pump 1 shown in FIG. 1, has a higher mountability on a vehicle compared to the water pump 1 because the pump body 11a is provided in a manner that a part of the pump body 11a is positioned at an inside of the driven pulley 40a, and thus the overall length L1 of the water pump 1a is less than that of the water pump 1. The water pump 1a also has a higher processability because the bearing shaft 10 may be made by press working.

Figure 8:
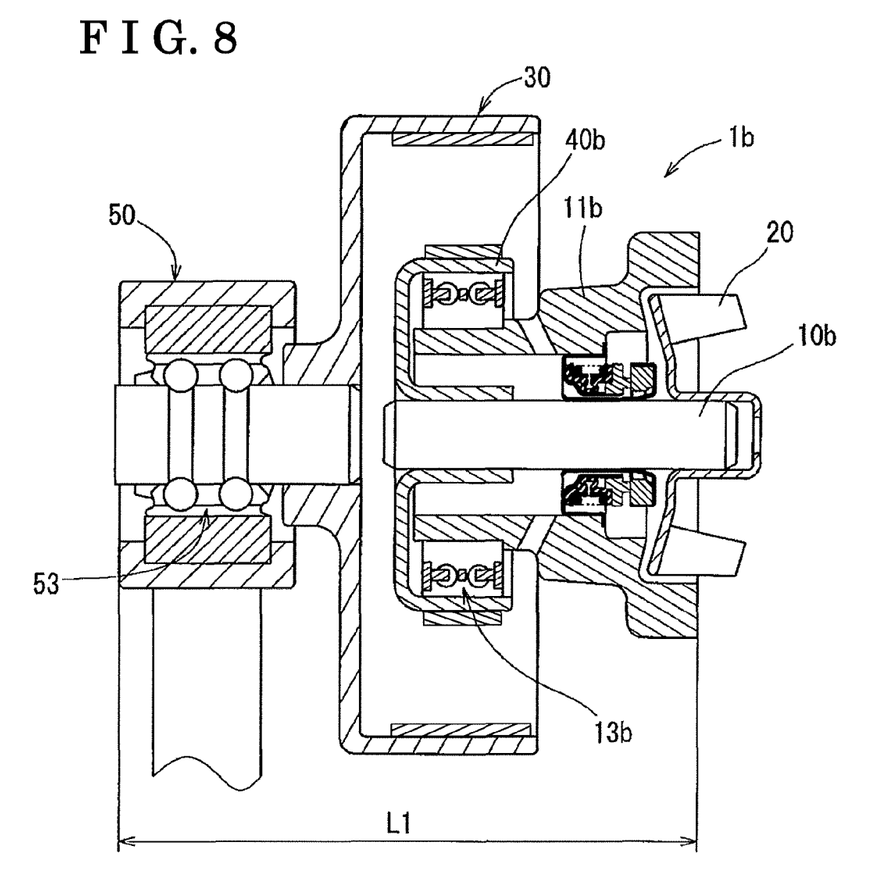
FIG. 8 is a cross-sectional view of a water pump related to a third embodiment disclosed here.

As shown in FIG. 8, a water pump 1b (the fluid pump) of a third embodiment of this disclosure is different from the water pump 1 shown in FIG. 1 in that the water pump 1b has the overall length L1 which is less than that of the water pump 1. Other structures are identical to those of the water pump 1 shown in FIG. 1. In the third embodiment, the identical numerical designations are given to the functions and the structures that are identical to those of the first embodiment.

A driven pulley 40b (the driven wheel) and a bearing shaft 10b (the drive shaft) both included in the water pump 1b are provided separately from each other as two parts. A pump body 11b (the housing) is provided in a manner that a part of the pump body 11b is positioned at an inside of the driven pulley 40b. A bearing 13b is provided between the pump body 11b and the driven pulley 40b in a radial direction of the bearing 13b. The bearing 13b supports the driven pulley 40b in a manner that the driven pulley 40b is rotatable unitarily with the bearing shaft 10b. Other structures and an operation of the water pump 1b are identical to those of the water pump 1.

The water pump 1b, which provides the identical effects obtained from the water pump 1 shown in FIG. 1, has a higher mountability on the vehicle compared to the water pump 1 because the pump body 11b is provided in a manner that a part of the pump body 11b is positioned at an inside of the driven pulley 40b, and thus the overall length L1 of the water pump 1b is less than that of the water pump 1. In addition, the water pump 1b also has a higher assemblability or assembly performance because the driven pulley 40b and the bearing shaft 10b are provided separately from each other as two parts and therefore, the pump body 11b, the bearing 13b and the mechanical seal 14 may be assembled on the bearing shaft 10b from a direction of the actuator 50.

Figure 9:
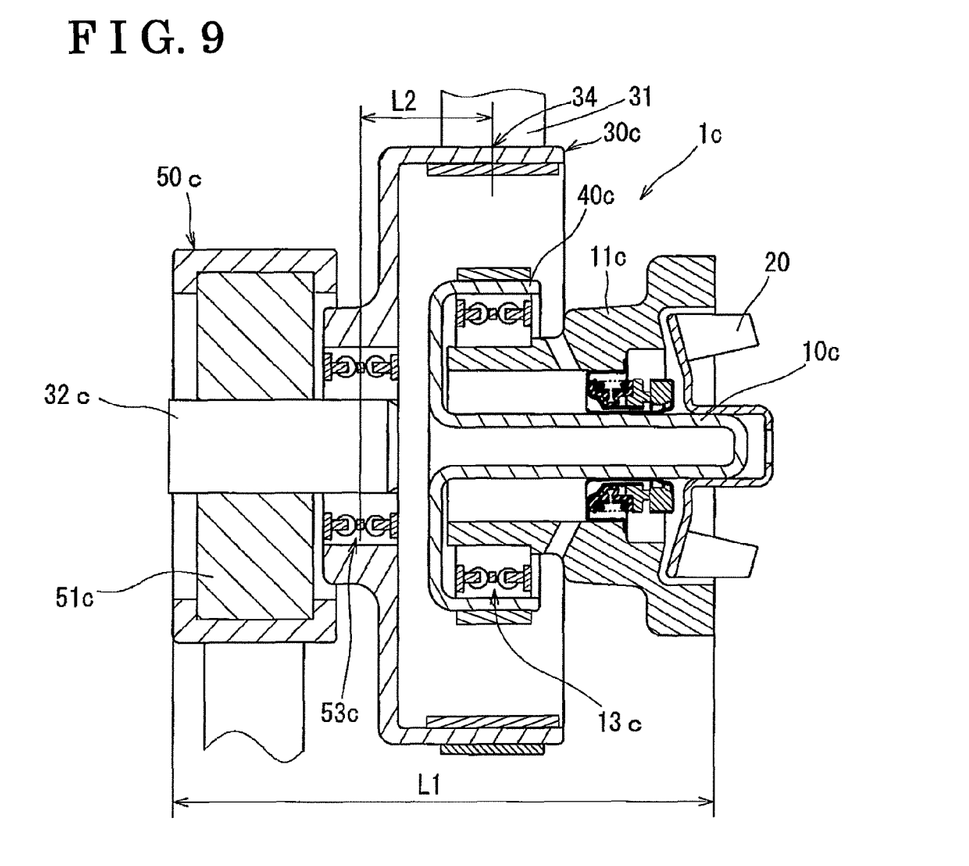
FIG. 9 is a cross-sectional view of a water pump related to a fourth embodiment disclosed here.

As shown in FIG. 9, a water pump 1c (the fluid pump) related to a fourth embodiment of this disclosure includes a driven pulley 40c (the driven wheel) and a bearing shaft 10c (the drive shaft) each having a different shape from those of the water pump 1 shown in FIG. 1. The water pump 1c also includes the overall length L1 that is less than that of the water pump 1. In the water pump 1c, a driving pulley bearing 53c supporting a driving pulley 30c (the driving wheel) is moved in an axial direction of the driving pulley bearing 53c so that a distance L2 between the pulley bearing 53c and a belt center 34, that is, the center of the belt 31 in a belt width direction, is reduced. Other structures are identical to those of the water pump 1 shown in FIG. 1. In the fourth embodiment, the identical numerical designations are given to the functions and the structures that are identical to those of the first embodiment.

The driven pulley 40c and the bearing shaft 10c both included in the water pump 1c are manufactured integrally with each other by press working. A pump body 11c (the housing) is provided in a manner that a part of the pump body 11c is positioned at an inside of the driven pulley 40c. A bearing 13c is provided between the pump body 11c and the driven pulley 40c in a radial direction of the bearing 13c. The bearing 13c supports the driven pulley 40c in a manner that the driven pulley 40c is rotatable unitarily with the bearing shaft 10c. The driving pulley 30c is supported by a driving pulley bearing shaft 32c via the bearing 53c in a manner that the driving pulley 30c rotates unitarily with the driving pulley bearing shaft 32. The bearing 53c is positioned between an actuator 50c (the displacement mechanism) and the belt center 34c in an axial direction of the bearing 53c. A slide 51c is provided at one end of the bearing shaft 10c which is closer to the actuator 50c. The slide 51c is movable in the perpendicular direction 62 relative to the direction of the resultant force 61 caused by the belt 31 that is wound around the outer circumferential surface of the driving pulley 30c. Other structures are identical to those of the water pump 1 shown in FIG. 1.

The water pump 1c, which provides the identical effects obtained from the water pump 1 shown in FIG. 1, has a higher mountability on the vehicle compared to the water pump 1 because the pump body 11c is provided in a manner that a part of the pump body 11c is positioned at an inside of the driven pulley 40c, and thus the overall length L1 of the water pump 1c is less than that of the water pump 1. In addition, the distance L2 between the pulley bearing 63c and the belt center 34 may be reduced. The driving pulley bearing 53c receives a bending load (the resultant force 61×the distance L2) caused by the resultant force 61 caused by the belt 31, however, the bending load is reduced by reducing the distance L2. Thus, in case that the bending load applied to the driving pulley bearing 53c is reduced, an unbalanced load applied to the driving pulley bearing 53c is reduced, resulting in a longer life of the driving pulley bearing 53c.

According to the first, second, third and the fourth embodiments of this disclosure, the power from the engine is transmitted from the driving pulley 30, 30c to the driven pulley 40, 40a, 40b, 40c by means of the friction force generated between the driving pulley 30, 30c and the driven pulley 40, 40a, 40b, 40c. However, the power from the engine may be transmitted by means of an engagement of gears. In this case, a gear ratio is used instead of the pulley ratio between the driving pulley 30, 30c and the driven pulley 40, 40a, 40b, 40.

The embodiments of this disclosure are not limited to the water pump 1, 1a, 1b, 1c but may apply, for example, to an oil pump.

The pressure in the closed chamber 55 that controls the actuator 50, 50c may be controlled by applying a positive pressure instead of the negative pressure.

In order to cause the driving pulley 30, 30c to come in contact with the driven pulley 40, 40a, 40b, 40c, a resilient body including but not limited to a rubber or air spring may be used instead of the spring.

According to the embodiments, the water pump 1, 1a, 1b, 1c includes the bearing shaft 10, 10a, 10b, 10c driven by the power from the engine, the impeller 20 adapted to be provided at the pump body 11, 11a, 11b and at the engine block 12 and rotating unitarily with the bearing shaft 10, 10a, 10b, 10c, the driving pulley 30, 30c which is provided separately from the bearing shaft 10, 10a, 10b, 10c and to which the power from the engine is always transmitted when the engine is running, the driven pulley 40, 40a, 40b, 40c transmitting the power from the engine to the bearing shaft 10, 10a, 10b, 10c upon being in contact with the driving pulley 30, 30c, and the actuator 50, 50c causing the driving pulley 30, 30c and the driven pulley 40, 40a, 40b, 40c to be out of contact from each other by moving at least one of the driving pulley 30, 30c and the driven pulley 40, 40a, 40b, 40c.

Due to the above described structure, the actuator 50, 50c causes the driving pulley 30, 30c and the driven pulley 40, 40a, 40b, 40c to be out of contact from each other. Consequently, when the engine starts up, the impeller 20 is stopped rotating, and thus the overcooling of the engine is restricted and the warm-up time of the engine is reduced. In addition, no power from the engine is transmitted to the impeller 20, thereby restricting the wasted consumption of the power.

According to the embodiments, the power from the engine is transmitted to the driving pulley 30, 30c by means of the belt 31 and the actuator 50, 50c moves the driving pulley 30, 30c in the perpendicular direction 62 perpendicular to the direction of the resultant force 61 of the tensile force 60a and the tensile force 60b that act on the driving pulley 30, 30c.

Due to the above described structure, the actuator 50, 50c moves the driving pulley 30, 30c in the perpendicular direction 62 perpendicular to the direction of the resultant force 61 of the tensile force 60a and the tensile force 60b both acting on the driving pulley 30, 30c. Thus, the resultant force 61 of the pressing forces that are caused by the belt 31 and are applied to the actuator 50, 50c is less likely to interfere with the movement of the actuator 50. Thus, the force of the actuator 50 for moving the driving pulley 30, 30c is restricted from acting against the resultant force 61 of the pressing forces that are caused by the belt 31 and are applied to the actuator 50, 50c. Consequently, the actuator 50, 50c needs to supply only sufficient force to move the driving pulley 30, 30c, and as a result, the actuator 50, 50c having a small size is provided.

According to the embodiments, the driving pulley 30, 30c has a cylindrical shape which includes the hollow portion and the driven pulley 40, 40a, 40b, 40c is provided at an inside of the hollow portion of the driving pulley 30, 30c.

Due to the above described structure, the driven pulley 40, 40a, 40b, 40c is provided at the inside of the driving pulley 30, 30c. Thus, the driving pulley 30, 30c and the driven pulley 40, 40a, 40b, 40c are arranged so as to overlap each other in the radial direction of the bearing shaft 10, 10a, 10b, 10c. As a result, the size of the water pump 1, 1a, 1b, 1c is reduced in the axial direction of the bearing shaft 10, 10a, 10b, 10c.

According to the embodiments, the driving pulley 30, 30c and the driven pulley 40a, 40b, 40c are configured to be unitarily rotatable with each other and the bearing 13a, 13b, 13c is provided between the inner circumferential surface of the driven pulley 40a, 40b, 40c and the pump body 11a, 11b, 11c in the radial direction of the driven pulley 40a, 40b, 40c.

Due to the above described structure, the bearing 13a, 13b, 13c is provided between the inner circumferential surface of the driven pulley 40a, 40b, 40c and the pump body 11a, 11b, 11c in the radial direction of the driven pulley 40a, 40b, 40c. Thus, the driving pulley 30, 30c and the driven pulley 40a, 40b, 40c are arranged so as to overlap each other in the radial direction of the bearing shaft 10a, 10b, 10c. As a result, the size of the water pump 1a, 1b, 1c is reduced in the radial direction of the bearing shaft 10a, 10b, 10c.

According to the embodiments, the actuator 50, 50c includes the spring 54 for causing the driving pulley 30, 30c to be in contact with the driven pulley 40, 40a, 40b, 40c by means of the resilient force.

Due to the above described structure, the actuator 50, 50c includes the spring 54 for causing the driving pulley 30, 30c to be in contact with the driven pulley 40, 40a, 40b, 40c by means of the resilient force. Thus, the driving pulley 30, 30c and the driven pulley 40, 40a, 40b, 40c are in contact with each other by means of the resilient force of the spring 54 when the actuator 50, 50c is under no control, that is, the pressure in the actuator 50, 50c is under no control, thereby operating the water pump 1, 1a, 1b, 1c. Consequently, the driving pulley 30, 30c and the driven pulley 40, 40a, 40b, 40c remain in contact with each other even in case that the actuator 50, 50c fails, thereby operating the water pump 1, 1a, 1b, 1c, which provides the fail-safe structure.

According to the embodiments, the actuator 50, 50c moves the driving pulley 30, 30c by means of the resilient force of the spring 54 and by means of the gas pressure.

Due to the above described structure, the actuator 50, 50c moves the driving pulley 30, 30c by means of the resilient force of the spring 54 and the gas pressure. Consequently, the actuator 50, 50c is controlled by utilizing the pressure existing around the engine, and thus there is no need to additionally provide the complicated mechanism including, for example, the electrical equipment, the hydraulic mechanism or the like, to the water pump 1, 1a, 1b, 1c.

According to the embodiments, the number of rotations of the impeller 20 is determined on the basis of the ratio of the diameter of the driving pulley 30, 30c and the diameter of the driven pulley 40, 40a, 40b, 40c.

Due to the above described structure, the number of rotations of the impeller 20 is determined on the basis of the ratio of the diameter of the driving pulley 30, 30c and the diameter of the driven pulley 40, 40a, 40b, 40c. Consequently, the discharge volume of the water pump 1, 1a, 1b, 1c is set at the desired value simply by changing the driving pulley 30, 30c or the driven pulley 40, 40a, 40b, 40c. As a result, without changing the impeller 20, the water pump 1, 1a, 1b, 1c that meets a wide range of the requirements on the discharge volume is provided.

The principles, preferred embodiments and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A fluid pump, comprising:
a drive shaft driven by power from an engine;
a rotor adapted to be provided at a housing and rotating unitarily with the drive shaft;
a driving wheel which is provided separately from the drive shaft, to which the power from the engine is always transmitted when the engine is running, and to which the power from the engine is directly transmitted via a power transmitting member;
a driven wheel transmitting the power from the engine to the drive shaft upon being in contact with the driving wheel; and
a displacement mechanism causing the driving wheel and the driven wheel to be out of contact from each other by moving the driving wheel.

2. The fluid pump according to claim 1, wherein the displacement mechanism moves the driving wheel in a perpendicular direction to a direction of a resultant force of forces that act on the driving wheel.

3. The fluid pump according to claim 1, wherein the driving wheel has a cylindrical shape which includes a hollow portion and the driven wheel is provided at an inside of the hollow portion of the driving wheel.

4. The fluid pump according to claim 2, wherein the driving wheel has a cylindrical shape which includes a hollow portion and the driven wheel is provided at an inside of the hollow portion of the driving wheel.

5. The fluid pump according to claim 1, wherein the driving wheel and the driven wheel are configured to be unitarily rotatable with each other and a bearing is provided between an inner circumferential surface of the driven wheel and the housing in a radial direction of the driven wheel.

6. The fluid pump according to claim 2, wherein the driving wheel and the driven wheel are configured to be unitarily rotatable with each other and a bearing is provided between an inner circumferential surface of the driven wheel and the housing in a radial direction of the driven wheel.

7. The fluid pump according to claim 3, wherein the driving wheel and the driven wheel are configured to be unitarily rotatable with each other and a bearing is provided between an inner circumferential surface of the driven wheel and the housing in a radial direction of the driven wheel.

8. The fluid pump according to claim 1, wherein the displacement mechanism includes a resilient member for causing the driving wheel to be in contact with the driven wheel by means of a resilient force.

9. The fluid pump according to claim 2, wherein the displacement mechanism includes a resilient member for causing the driving wheel to be in contact with the driven wheel by means of a resilient force.

10. The fluid pump according to claim 3, wherein the displacement mechanism includes a resilient member for causing the driving wheel to be in contact with the driven wheel by means of a resilient force.

11. The fluid pump according to claim 5, wherein the displacement mechanism includes a resilient member for causing the driving wheel to be in contact with the driven wheel by means of a resilient force.

12. The fluid pump according to claim 8, wherein the displacement mechanism moves the driving wheel by means of the resilient force of the resilient member and by means of a gas pressure.

13. The fluid pump according to claim 9, wherein the displacement mechanism moves the driving wheel by means of the resilient force of the resilient member and by means of a gas pressure.

14. The fluid pump according to claim 10, wherein the displacement mechanism moves the driving wheel by means of the resilient force of the resilient member and by means of a gas pressure.

15. The fluid pump according to claim 11, wherein the displacement mechanism moves the driving wheel by means of the resilient force of the resilient member and by means of a gas pressure.

16. The fluid pump according to claim 1, wherein a number of rotations of the rotor is determined on the basis of a ratio of a diameter of the driving wheel and a diameter of the driven wheel.

17. The fluid pump according to claim 2, wherein a number of rotations of the rotor is determined on the basis of a ratio of a diameter of the driving wheel and a diameter of the driven wheel.

18. The fluid pump according to claim 3, wherein a number of rotations of the rotor is determined on the basis of a ratio of a diameter of the driving wheel and a diameter of the driven wheel.

19. The fluid pump according to claim 5, wherein a number of rotations of the rotor is determined on the basis of a ratio of a diameter of the driving wheel and a diameter of the driven wheel.

20. The fluid pump according to claim 8, wherein a number of rotations of the rotor is determined on the basis of a ratio of a diameter of the driving wheel and a diameter of the driven wheel.

21. The fluid pump according to claim 1, wherein the displacement mechanism is a radial displacement mechanism.

* * * * *